(12) United States Patent
Kopp

(10) Patent No.: US 11,215,273 B2
(45) Date of Patent: Jan. 4, 2022

(54) TRANSMISSION WITH A HEATING ELEMENT FOR INDIRECTLY HEATING AN OPERATING MEDIUM, AND MOTOR VEHICLE

(71) Applicant: AUDI AG, Ingolstadt (DE)

(72) Inventor: Andreas Kopp, Kösching (DE)

(73) Assignee: AUDI AG, Ingolstadt (DE)

( * ) Notice: Subject to any disclaimer, the term of this patent is extended or adjusted under 35 U.S.C. 154(b) by 281 days.

(21) Appl. No.: 16/338,022

(22) PCT Filed: Sep. 25, 2017

(86) PCT No.: PCT/EP2017/074226
§ 371 (c)(1),
(2) Date: Mar. 29, 2019

(87) PCT Pub. No.: WO2018/060135
PCT Pub. Date: Apr. 5, 2018

(65) Prior Publication Data
US 2019/0242471 A1    Aug. 8, 2019

(30) Foreign Application Priority Data

Sep. 29, 2016 (DE) .................... 10 2016 218 910.7

(51) Int. Cl.
*F16H 57/04* (2010.01)
*H05B 1/02* (2006.01)

(52) U.S. Cl.
CPC ..... *F16H 57/0419* (2013.01); *F16H 57/0413* (2013.01); *H05B 1/0236* (2013.01)

(58) Field of Classification Search
CPC ............. F16H 57/0413; F16H 57/0419; F16H 57/0452; F01M 5/021; F01M 5/001;
(Continued)

(56) References Cited

U.S. PATENT DOCUMENTS 5,017,758 A  *  5/1991  Kirkman ................ F01M 5/021
                                                            123/142.5 E
5,352,862 A  *  10/1994  Barr ...................... F01M 5/021
                                                            123/142.5 R
(Continued)

FOREIGN PATENT DOCUMENTS

CN          202040516 U       11/2011
CN          202812149 U        3/2013
(Continued)

OTHER PUBLICATIONS

Office Action dated Mar. 2, 2020, in corresponding European Application No. 17 776 998.1 including partial machine-generated English language translation; 11 pages.
(Continued)

*Primary Examiner* — Luis A Gonzalez
(74) *Attorney, Agent, or Firm* — Maier & Maier, PLLC

(57) ABSTRACT

A transmission for a motor vehicle, including a housing, which at least partly encloses at least one movable transmission part and is filled with an operating medium during a normal operation of the transmission, and including a heating element which dispenses a heat output in order to heat the operating medium. One object is to increase a coupling surface for dispensing a heat output to the operating medium in a simple manner. The heating element is designed to dispense the heat output to the housing via a first coupling surface, and the housing is designed to dispense the heat output to the operating medium via a second coupling surface. The heat output can be transmitted from the heating element to the operating medium in a significantly indirect manner via the housing.

19 Claims, 3 Drawing Sheets

(58) Field of Classification Search
CPC ............ F01M 5/005; F01M 11/0004; F01M 2011/0025; H05B 1/0236
See application file for complete search history.

(56) References Cited

U.S. PATENT DOCUMENTS

| | | | |
|---|---|---|---|
| 5,895,590 A | 4/1999 | Suzuki | |
| 7,015,428 B2 * | 3/2006 | Kirkman | ................ H05B 3/28 123/142.5 E |
| 2005/0202933 A1 | 9/2005 | Sorab et al. | |
| 2011/0226089 A1 * | 9/2011 | Riedel | ................ F16H 57/0413 74/606 A |
| 2012/0175358 A1 | 7/2012 | Davidson, Jr. | |

FOREIGN PATENT DOCUMENTS

| | | | | |
|---|---|---|---|---|
| CN | 103062616 A | 4/2013 | | |
| DE | 102007055496 A1 * | 1/2009 | ......... | F01M 11/0004 |
| DE | 102008020646 A1 | 10/2009 | | |
| DE | 102010041412 A1 | 3/2012 | | |
| DE | 102011120748 A1 | 6/2013 | | |
| DE | 10 2013 203 715 A1 | 9/2013 | | |
| DE | 102015200933 A1 * | 7/2016 | ............. | F01M 11/00 |
| JP | 2003-314673 A | 11/2003 | | |
| JP | 2004257266 A | 9/2004 | | |
| JP | 2005-226711 A | 8/2005 | | |
| JP | 2012-159173 A | 8/2012 | | |
| WO | 2008/141811 A2 | 11/2008 | | |

OTHER PUBLICATIONS

Notification of Transmittal of Translation of the International Preliminary Report on Patentability dated Apr. 11, 2019, in connection with corresponding international Application No. PCT/EP2017/074226 (10 pgs.).
German Search Report dated May 4, 2017 in corresponding German Application No. 102016218910.7; 12 pages.
International Search Report and Written Opinion dated Dec. 4, 2017 in corresponding International Application No. PCT/EP2017/074226; 28 pages.
German Office Action dated May 6, 2021, in connection with corresponding DE Application No. 10 2016 218 910.7 (15 pp., including machine-generated English translation).
Chinese Office Action dated Jul. 16, 2021, in connection with corresponding CN Application No. 201780059975.3 (13 pp., including machine-generated English translation).

* cited by examiner

TRANSMISSION WITH A HEATING ELEMENT FOR INDIRECTLY HEATING AN OPERATING MEDIUM, AND MOTOR VEHICLE

FIELD

The disclosure relates to a transmission for a motor vehicle with a housing which is filled during a normal operation of the transmission with an operating medium, and with a heating element for the operating medium. The disclosure also relates to a motor vehicle with a transmission according to the disclosure.

BACKGROUND

A transmission can serve in a motor vehicle to convert mechanical magnitudes, in particular forces, torques and/or speeds in particular in a drive train of the motor vehicle. Examples for transmission in a motor vehicle are power dividers, differentials, especially front axle differentials or rear axle differentials, as well as a vehicle transmission which translates an engine speed to a drive speed. The motor vehicle transmission can be constructed as a manual shifting transmission which can be manually shifted by a driver, as an automatic transmission, for example as an automatic converter transmission or a double-clutch transmission, or as an automated shifting transmission. The transmission can heat up due to losses in the transmission, in particular friction losses on movable parts of the transmission. An operating medium can be provided for cooling and for lubricating the movable parts of the transmission.

The operating medium can be thermally coupled by a heat exchanger to a cooling fluid of the motor vehicle. This makes possible a heating of the operating medium if the cooling medium is warm and the operating medium is cold or makes a cooling of the operating medium possible if the operating medium is warm. The operating medium can consist, for example, of oil, for example transmission oil or differential transmission oil.

If the operating medium is cold, for example at the start of driving or in the case of an insufficient heating via the cooling medium, for example, in the case of an electrically operated motor vehicle, high friction losses result, for example, in the range of several kilowatts due to an elevated viscosity of the operating medium. In order to ensure a rapid heating of the operating medium, it can be provided that the operating medium is heated by a heating element.

For example, JP 2003 314 673 A discloses a heating element with a tubular construction and through which the operating medium flows, wherein in one operating state air is heated at first on a heat exchanger by the hot exhaust gas and subsequently flows through the heating element.

CN 202 040 516 U discloses a heating element designed as a heating wire, wherein the heating element is thermally coupled by a casing to the operating medium.

U.S. Pat. No. 5,895,590 A discloses a heating device for an operating medium, wherein a heating element is put in operation by a control device exactly when a charging state of an electrical energy storage meets a predefined condition and the temperature of the operating medium is below a predefined value.

During the heating of the operating medium, in particular of an oil, the heat output emitted per surface to the operating medium should not exceed a predefined value. Upon the dispensing of too great a heat output per surface unit on a thermal coupling surface of the operating medium, chemical processes can take place in the operating medium. As a consequence, its properties, in particular its lubricating properties can become worse. In particular, the thermal output on the coupling surface of the operating medium should not exceed a value of 2.5 watts per square centimeter. The maximal possible heat dissipation from the heating element to the operating medium is therefore limited by the size of the coupling surface for dispensing the heat output to the operating medium. Accordingly, for dispensing a large heat output, a large heating element is necessary. Frequently, insufficient structural space is available for this.

SUMMARY

It is the object of the present invention, to enlarge a coupling surface for dispensing a heat output to the operating medium in a simple manner.

Advantageous further developments of the invention are described by the dependent claims, the following description and the figures.

A transmission for a motor vehicle comprises a housing, at least partially surrounding at least one movable transmission part, in particular a shaft, a gear or a planet transmission and is filled in a normal operation of the transmission by an operating medium. The operating medium can serve to distribute heat or to remove heat in the transmission and/or to lubricate the at least one movable transmission part. The operating medium is, in particular, an oil, preferably a mineral oil or one based on water with additives. During an operation of the transmission, the operating medium, when it is cold, can cause high transmission losses. For this reason, a heating element is provided which is constructed to dispense a heat output for heating the operating medium.

The heating element is designed to dispense or transmit the heat output primarily or completely indirectly, namely via the housing, to the operating means in an operating state. In order to enlarge a coupling surface for dispensing the heat output to the operating means in a simple manner, the invention provides that the heating element is designed for dispensing the heat output to the housing via a first coupling surface and that the housing is designed for dispensing the heat output to the operating means via a second coupling surface and as a result the heat output can be transferred primarily or completely indirectly via the housing from the heating element to the operating medium, namely, from the heating element into the housing and from the housing into the operating medium.

The first coupling surface can be formed by a contact surface of the heating element with the housing. The second coupling surface can be formed by those surfaces on which a dispensing of heat output by the housing to the operating medium takes place with more than 0.25 watt/cm$^2$ or 0.5 watt/cm$^2$ (watts per square centimeter) or 1 watt/cm$^2$ or 1.5 watt/cm$^2$ or 2 watts/cm$^2$, but in particular with less than 2.5 watts/cm$^2$. The coupling surface for dispensing the heat output to the operating medium can be formed by those surfaces at which a heat output of more than 0.25 watt/cm$^2$ or 0.5 watt/cm$^2$ or 1 watt/cm$^2$ or 1.5 watt/cm$^2$ or 2 watt/cm$^2$ takes place, in particular by the housing and/or directly by the heating element, preferably with less than 2.5 watt/cm$^2$. The coupling surface for dispensing the heat output to the operating medium is designated in the following as the operating medium coupling surface.

The heating element can either be designed exclusively for dispensing the heat output to the housing by the first coupling surface or for dispensing the heat output to the housing by the first coupling surface as well as for the direct dispensing of the heat output to the operating medium by a third coupling surface. However, if the heating element is also designed for the direct dispensing of the heat output to the operating medium, the dispensing of the heat output to the operating medium takes place primarily indirectly via the housing. As a result of the significantly indirect heat output of the heating element to the operating medium by the housing, the operating medium coupling surface, which is composed, in particular, by the second coupling surface and the third coupling surface, can be enlarged with simple means compared to the prior art.

In an embodiment of the invention the heating element for dispensing at least half of the heat output to the housing is formed by the first coupling surface. In particular, the heating element for dispensing at least half of the heat output generated by the heating element to the housing is formed by the first coupling surface. The heating element is preferably formed for dispensing at least 60 percent or 70 percent or 80 percent or 90 percent of the heat output generated by the heating element to the housing by the first coupling surface.

In a further development of the invention, the second coupling is at least 2 times larger than the first coupling surface and the housing is constructed for distributing the heat output from the smaller, first coupling surface onto the larger, second coupling surface. The second coupling surface is preferably at least 3 times or 4 times or 5 times larger than the first coupling surface. As a result of the fact that the second coupling surface is larger than the first coupling surface, the heating element can be designed to be especially compact in comparison to the coupling surface for dispensing the heat output to the operating medium. However, the fact that the second coupling surface is at least 2 times or 3 times or 4 times or 5 times larger than the first coupling surface, results in a large coupling surface for dispensing the heat output to the operating medium.

In one embodiment, the transmission is designed for distributing the heat output by the housing, as a result of which the first coupling surface has a higher temperature than the second coupling surface during the operation of the heating element. Accordingly, the housing can be designed for distributing the heat output from a high temperature on the first coupling surface to a low temperature on the second coupling surface. In particular, the housing is designed to distribute the heat output from a small surface and a high temperature on the first coupling surface to a large surface and a low temperature on the second coupling surface.

In a further development of the invention the outside of the housing has a thermal layer of insulation. The thermal layer of insulation can reduce thermal losses by dissipating heat of the housing toward the outside of the housing. In particular, an action of directing heat output from the heating element toward the inside of the housing can be achieved.

In one embodiment of the invention the housing is manufactured with a housing part from a first material and comprises a heat conduction element for distributing and/or conducting the heat output, wherein the heat element is formed from a second material which has a larger coefficient of thermal conduction than the first material. The heat element can make a purposeful guiding of the heat output via the housing possible. The heat conducting element can be designed to increase the second coupling surface by an improved guiding of heat in the housing. In particular, the housing can comprise several heat conducting elements.

In one embodiment of the invention the heating element for producing the heat output can be electrically operated. In other words, the heating element is electrically operated in a state of operation. An especially compact structural shape of the heating element can result from the electrically operable heating element. The dissipation of heat output by the electrical heating element can be controlled especially easily by the controlling of an electrical output supplied to the electrical heating element.

In a further development of the invention a carrier device is made available for receiving the heating element on the housing. The carrier device can be part of the housing or can be fastened on the housing. In particular, the carrier device can be fastened on the housing by a screw thread. An especially simple fixing and/or retrofitting of the heating element on the housing is made possible by the carrier device.

In a further development of the invention the carrier device is screwed into a screw thread of an outlet opening for the operating medium. In this manner an especially simple mounting of the heating element on the housing can be made possible. In particular, structural adaptations of the transmission and/or of the transmission housing can be eliminated if an already present outlet opening is constructed for fixing the carrier device by the screw thread.

The invention furthermore comprises a motor vehicle with a transmission according to the invention. The advantageous further developments and embodiments of the transmission according to the invention and their advantages also analogously apply to the motor vehicle according to the invention.

BRIEF DESCRIPTION OF THE FIGURES

An exemplary embodiment of the invention is described in the following. In the figures.

DETAILED DESCRIPTION

Figure 1:
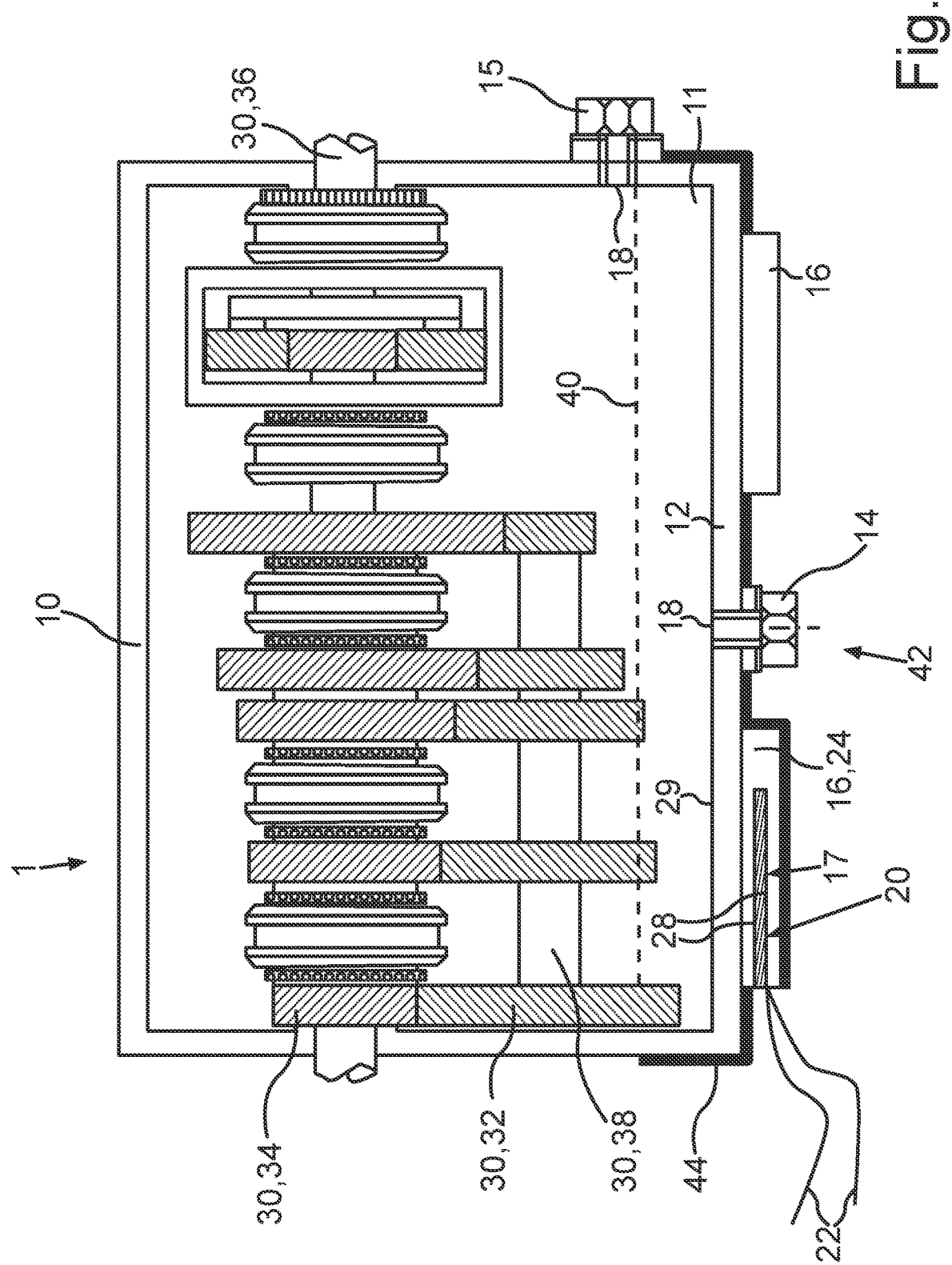
FIG. 1 shows a schematic sectional view of a first exemplary embodiment of a transmission according to the invention.
Figure 2:
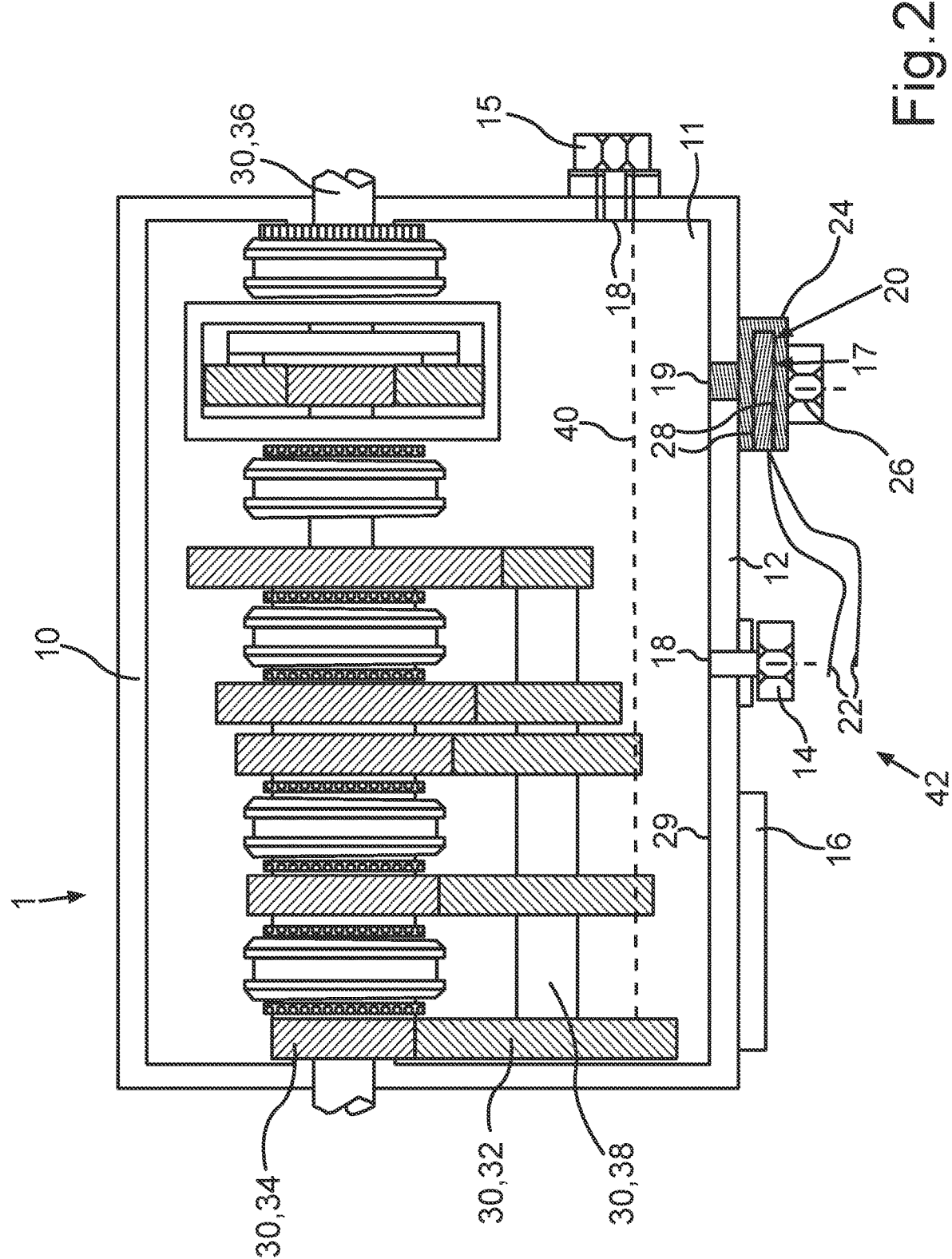
FIG. 2 shows a schematic sectional view of a second exemplary embodiment of a transmission according to the invention.
Figure 3:
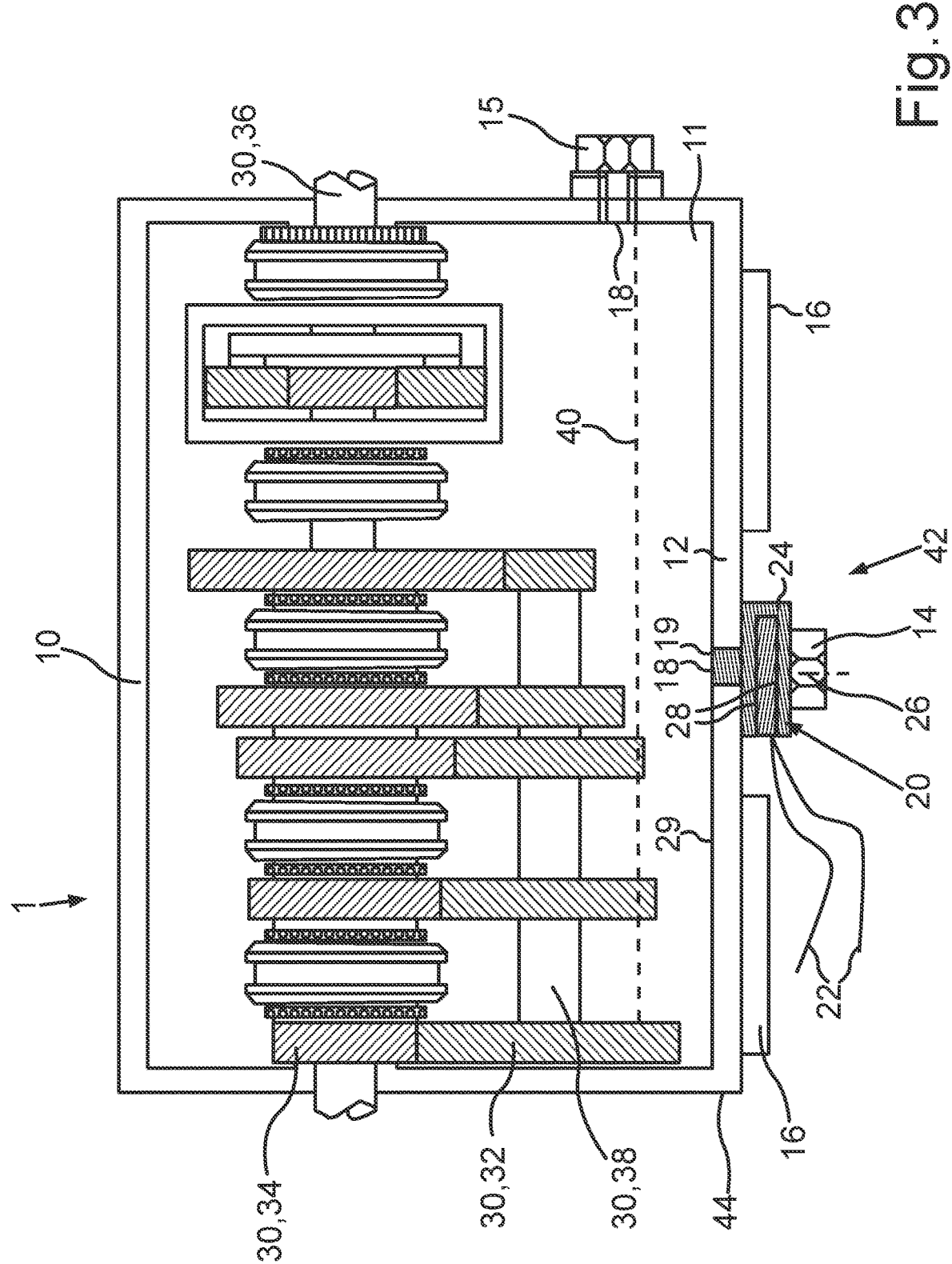
FIG. 3 shows a schematic sectional view of a third exemplary embodiment of a transmission according to the invention.

FIG. 1, FIG. 2 and FIG. 3 show a transmission 1 for a motor vehicle with a housing 10 which comprises several movable transmission parts 30, in the present case. The housing 10 is filled with an operating medium 11, in the present case a transmission oil, up to a filled oil level 40. The operating medium 11 is designed to lubricate the movable transmission parts 30 of the transmission 1. The movable transmission parts 30 are at least partially in motion during an operation of the transmission 1. An optimum lubrication of the movable transmission parts 30 can reduce wear and extend the service life. The movable transmission parts 30 comprise, in the present case, gears 32 on the output side, gears 34 on the input side, an output-side shaft 38 and an input-side shaft 36. The transmission parts 30 can be designed to transfer and/or convert drive forces of the motor vehicle. In particular, the transmission parts 30 can be designed to convert a torque and/or a speed and/or a force. In particular, the supply of force into the transmission takes place via the input-side shaft 36, which can be designed as a drive shaft. In particular, the removal of force from the transmission 1 takes place by the output-side shaft 38, which can be designed as an output shaft.

The operating medium 11, designed in the present case as transmission oil, can be designed in other embodiments as another oil, in particular a mineral oil or one based on water with suitable additives. The housing 10 comprises two outlet openings 18 for the operating medium 11. One of the outlet openings 18 is closed, in the present case, with an oil discharge screw 14, and another one of the outlet openings 18 is closed, in the present case, with an oil control screw 15.

The lubrication of the movable transmission parts 30 only takes place in an optimal manner if the operating medium 11 has a predetermined operating temperature. If the temperature of the operating medium 11 is less than the predefined operating temperature of the operating medium 11, high transmission losses can be produced during the transfer of the drive forces of the motor vehicle. As a consequence, the fuel consumption is increased in the case of a motor vehicle with an internal combustion engine and the consumption of electrical energy is increased in the case of a motor vehicle with an electrical drive. Depending on the time of year and the outdoor temperature, the transmission losses can be in the range of, for example, 1.5 kW to 5 kw if the temperature of the operating medium 11 is lower than the predetermined operating temperature. In contrast thereto, the transmission losses are in the range of, for example, 100 W to 500 W if the temperature of the operating medium 11 corresponds to the predetermined operating temperature. Furthermore, wear and tear of the movable transmission parts 30 can be increased by a cold operating medium 11.

In order to rapidly heat the operating medium 11 to its predetermined operating temperature, the transmission 1 has a heating element 20. The heating element 20 is designed to dispense a heat output for heating the operating medium 11. The heating element 20 can be electrically operated, in the present case. That means that the heating element 20 is electrically operated in a heating operation. In the heating operation, electric current flows through the heating element 20 and provides the heat output by a supplied electrical output. In other embodiments, the heating element 20 can be designed as a heat exchanger, in particular for the exchange of exhaust gas heat or heat from the cooling circuit of the motor vehicle or can be operated by a fuel. An electrically heatable heating element 20 can comprise wires 22 for the supplying of an electrical output. In particular, an electrically operable heating element 20 makes possible an especially simple regulating of the dispensing of the heat output by the heating element 20 by controlling an electrical output supplied to the heating element 20.

In order to enlarge an operating medium coupling surface or a total coupling surface for transferring heat output to the operating medium 11, the heating element 20 is designed, in the present case, to dissipate the heat output to the housing 10 via a first coupling surface 28, and the housing 10 is designed to dissipate the heat output to the operating medium 11 via a second coupling surface 29. In the present case, the heating element 20 is not designed to directly dissipate heat output to the operating medium 11. A partial area of the housing 10 can be designed as a heat conduction element 12. In the present case, the entire lower part of the housing 10 is designed as a heat conduction element 12. The heat conduction element 12 is formed from a material, in particular metal, with an especially large coefficient of heat conduction. For this reason, the second coupling surface 29 for dissipating heat output from the housing 10 to the operating medium 11 is especially large. In particular, the second coupling surface 29 is at least 2 times, preferably 3 times or 4 or 5 times larger than the first coupling surface 28.

The heating element 20 is designed, in the present case, for dispensing the heat output with a high temperature via the small first coupling surface 28. The transmission 1 is designed, in the present case, to distribute the heat output dispensed by the heating element 20 from the first coupling surface 28 onto the second coupling surface 29 by the housing 10, and especially by the heating element 12. The temperature can be reduced by the distribution of the heat output from the small first coupling surface 28 onto the large second coupling surface 29. In particular, the temperature of the first coupling surface 28 is higher than that of the second coupling surface 29. The housing 10 is designed by the second coupling surface 29 to dissipate the heat output onto the operating medium 11. In particular, those areas of the housing 10 are designated as coupling surface 29, on which a dispensing of heat output from the housing 10 onto the operating medium 11 takes place with a thermal output density of more than 0.25 w/cm$^2$ (watt per square centimeter) or 0.5 w/cm$^2$ or 1 w/cm$^2$ or 1.5 w/cm$^2$ or 2 w/cm$^2$. In particular, the first coupling surface 28 is the contact surface between the heating element 20 and the housing 10. As a result of the large-area second coupling surface 29, the dispensing of large heat outputs to the operating medium 11 is made possible without exceeding a predefined boundary value, in particular of 2.5 watts per square centimeter, for the output density of the dispensing of heat output to the operating medium 11. In particular, chemical or physical structural changes of the operating medium 11 can be avoided by too high temperatures on the second coupling surface 29.

An especially compact structural shape of the transmission 1 is made possible by using the housing 10 for dissipating heat output to the operating medium 11, since it is not necessary to place a heating element 20 inside the housing 10. In particular, it is not necessary to provide several and/or large-area heating elements 20 inside the housing 10.

FIG. 1 shows a first embodiment of a transmission 1 with a heating element 20 for the indirect dissipating of the heat output to the operating medium 11 by the housing 10. The housing 10 has two ribs 16, in the present case, which are designed, for example, to stabilize the housing 10. One of the ribs 16 is designed as a carrier device 24 for the heating element 20. The carrier device 24 has a receptacle 17 designed to receive the heating element 20. The contacting surfaces of the receptacle 17 and of the heating element 20 form the first coupling surface. In particular, the rib 16 designed as the carrier device 24 can be designed as another heat conduction element for distributing and/or conducting the heat output.

FIG. 2 shows a second embodiment of a transmission 1 according to the invention, wherein the housing 10 comprises a carrier bore 19 for fixing a carrier device 24. In particular, the carrier device 24 can be fixed with screws on the housing 10 by a screw thread and a corresponding screw thread of the carrier bore 19. The carrier device 24 can be partially designed as a nut 26 in order to facilitate a fixing of the carrier device 24 on the housing 10. The carrier device 24 has a receptacle 17 for receiving the heating element 20. The contact surfaces between receptacle 17 and heating element 20 also form the first coupling surface 28 here. The housing 10 comprises a heat conduction element 12 in its lower area which element is designed to distribute and/or conduct the heat output along the second coupling surface 29.

FIG. 3 shows a third embodiment of a transmission 1, wherein an outlet opening 18 is formed as carrier bore 19.

The fixing of the carrier device 24 by the screw thread and the fixing of the heating element 20 is analogous to FIG. 2.

The screw thread between carrier bore 19 and carrier device 24 can form another coupling surface which is designed to dispense heat output from the carrier device 24 onto the housing 10.

In other embodiments of the invention which are not shown, a third coupling surface is designed for the direct dispensing of the heat output from the heating element 20 to the operating medium 11.

A control unit can be provided for regulating a dispensing of an output of the heating element 20 which control unit is designed to evaluate a temperature signal of a temperature sensor in the housing 10, wherein the temperature signal describes the temperature of the operating medium 11. Furthermore, the control unit can be designed to compare the temperature of the operating medium 11 with a predefined temperature value corresponding, in particular, to the given operating temperature of the operating medium 11. If the temperature of the operating medium 11 is lower than the predefined temperature value, an electrical output can be provided on the heating element 20 by the wires 22. If the temperature value of the operating medium 11 corresponds to the predefined temperature value or is greater than the latter, it can be provided that no electrical output is supplied to the heating element 20.

The transmission 1 can be constructed as an automatic shifting transmission, as a manual shifting transmission, as a partially automatic shifting transmission, as a power divider or as a differential.

The use of one heating element 20 or of several heating elements 20 can be provided. The heating element 20 can be directly introduced into the housing 10, thus ensuring a permanent and uniformly distributed transmission of heat onto the housing 10 and from the housing 10 into the operating medium 11. The housing 10 is constructed, in particular, partially from a metal with a good coefficient of thermal conduction. As a result, a heat conduction element 12 can be formed. Therefore, the heat output can be uniformly dispensed to the operating medium 11 via the large surface of the housing 10 as the second coupling surface 29.

The housing 10 can have, in particular, an insulating layer 44 on its bottom 42. A dispensing of heat from the housing 10 to its outer side can be reduced or prevented by the insulating layer 44. In this manner, a heat output of the heating element 20 can be reduced with the same heating effect on the operating medium 11. Alternately or additionally, the second coupling surface 29 can be enlarged and/or a more rapid heating of the operating medium 11 can be achieved due to directivity of the heat dissipation resulting from the insulating layer 44.

The transmission can be designed as a power divider, differential, in particular a front axle differential or a rear axle differential or as a vehicle transmission which translates an engine speed to a drive speed for a motor vehicle. The transmission 1 can be designed as a manual shifting transmission which is shifted manually by a driver, as an automatic transmission, for example, as an automatic converter transmission or double-clutch transmission, or as an automated shifting transmission.

The invention claimed is:

1. A transmission for a motor vehicle, comprising:
   a housing which at least partially surrounds a movable transmission part and is filled in a normal operation of the transmission by an operating medium, and
   a heating element which dispenses a heat output for heating the operating medium,
   wherein the heating element dispenses the heat output on the housing via a first coupling surface, and the housing dispenses the heat output to the operating medium via a second coupling surface, and, as a result, the heat output can be transmitted primarily or completely indirectly via the housing from the heating element to the operating medium,
   wherein the housing comprises an upper housing part and a lower housing part,
   wherein the upper housing part is formed from a first material, and the lower housing part is formed from a second material, and
   wherein the second material has a larger thermal conductivity than that of the first material, and the lower part of the housing is designed as a heat conduction element for distributing and/or conducting the heat output.

2. The transmission according to claim 1, wherein the heating element dissipates at least one half of the heat output to the housing by the first coupling surface.

3. The transmission according to claim 2, wherein the second coupling surface is at least two times larger than the first coupling surface and the housing distributes the heat output from the smaller first coupling surface onto the larger second coupling surface.

4. The transmission according to claim 2, wherein the transmission distributes the heat output by the housing and, as a consequence, the first coupling surface has a higher temperature than the second coupling surface during the operation of the heating element.

5. The transmission according to claim 2, wherein an outer surface of the housing is at least partially lined with an insulating layer.

6. The transmission according to claim 2, wherein the heating element extends at least partially through the housing.

7. The transmission according to claim 1, wherein the second coupling surface is at least two times larger than the first coupling surface and the housing distributes the heat output from the smaller first coupling surface onto the larger second coupling surface.

8. The transmission according to claim 7, wherein the transmission distributes the heat output by the housing and, as a consequence, the first coupling surface has a higher temperature than the second coupling surface during the operation of the heating element.

9. The transmission according to claim 7, wherein an outer surface of the housing is at least partially lined with an insulating layer.

10. The transmission according to claim 7, wherein the heating element extends at least partially through the housing.

11. The transmission according to claim 1, wherein the transmission distributes the heat output by the housing and, as a consequence, the first coupling surface has a higher temperature than the second coupling surface during the operation of the heating element.

12. The transmission according to claim 11, wherein an outer surface of the housing is at least partially lined with an insulating layer.

13. The transmission according to claim 11, wherein the heating element extends at least partially through the housing.

14. The transmission according to claim 1, wherein an outer surface of the housing is at least partially lined with an insulating layer.

15. The transmission according to claim 14, wherein the heating element extends at least partially through the housing.

16. The transmission according to claim 1, wherein the heating element extends at least partially through the housing.

17. The transmission according to claim 1, wherein the heating element can be electrically operated in order to generate the heat output.

18. The transmission according to claim 1, wherein a carrier device for receiving the heating element is made available on the housing.

19. The transmission according to claim 18, wherein the carrier device is screwed into a screw thread of an outlet opening for the operating medium.

* * * * *